(12) United States Patent
Barbieri et al.

(10) Patent No.: US 8,204,317 B2
(45) Date of Patent: Jun. 19, 2012

(54) METHOD AND DEVICE FOR AUTOMATIC GENERATION OF SUMMARY OF A PLURALITY OF IMAGES

(75) Inventors: Mauro Barbieri, Eindhoven (NL); Lalitha Agnihotri, Tarrytown, NY (US); Nevenka Dimitrova, Bangalore (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 959 days.

(21) Appl. No.: 12/281,005

(22) PCT Filed: Feb. 27, 2007

(86) PCT No.: PCT/IB2007/050622
§ 371 (c)(1),
(2), (4) Date: Aug. 28, 2008

(87) PCT Pub. No.: WO2007/099496
PCT Pub. Date: Sep. 7, 2007

(65) Prior Publication Data
US 2009/0041356 A1 Feb. 12, 2009

(30) Foreign Application Priority Data
Mar. 3, 2006 (EP) .................................... 06300198

(51) Int. Cl.
*G06K 9/62* (2006.01)
*H04N 9/80* (2006.01)
(52) U.S. Cl. ......................................... 382/224; 386/241
(58) Field of Classification Search .................. None
See application file for complete search history.

(56) References Cited

U.S. PATENT DOCUMENTS

| 6,331,859 | B1 * | 12/2001 | Crinon ........................... 345/619 |
| 6,535,639 | B1 * | 3/2003 | Uchihachi et al. ............ 382/225 |
| 6,763,069 | B1 | 7/2004 | Divakaran et al. |
| 2002/0093591 | A1 * | 7/2002 | Gong et al. .................... 348/515 |

(Continued)

FOREIGN PATENT DOCUMENTS
EP  1067800 A1  1/2001
(Continued)

OTHER PUBLICATIONS

Smith et al., "Video skimming for quick browsing based on audio and image characterization", Technical Report, Carnegie Mellon University, 1995.*

(Continued)

*Primary Examiner* — Li Liu (57) ABSTRACT

Method and device for providing a summary of a plurality of images, e.g. a video sequence. The method includes dividing the video sequence into a plurality of segments. The segments are analyzed with respect to content and a set of content descriptors are associated to the segments. Preferably, additional textual information about the segments, screenplay etc., is used to determine the content descriptors. A graph representing relations between the segments is constructed indicating relations between segments. Weights are associated to the relations so as to represent a measure of relation, e.g. a logical correlation, between segments. The weights are based on the calculated content descriptors. A relevance measure for a segment is determined based on all weights associated with relations to said segment. Finally, a summary is generated by selecting the most relevant segments. The method can create an automatic summary of a film that preserves all the logical plot of the original but is shorter in duration (e.g. 70% of the original film) while the original playback rate is preserved.

18 Claims, 3 Drawing Sheets

U.S. PATENT DOCUMENTS

| | | | |
|---|---|---|---|
| 2003/0081937 A1* | 5/2003 | Li | 386/52 |
| 2003/0152363 A1* | 8/2003 | Jeannin et al. | 386/68 |
| 2004/0088723 A1 | 5/2004 | Ma et al. | |
| 2004/0255249 A1 | 12/2004 | Chang et al. | |
| 2005/0002647 A1 | 1/2005 | Girgensohn et al. | |
| 2009/0080853 A1* | 3/2009 | Chen et al. | 386/52 |

FOREIGN PATENT DOCUMENTS

| | | |
|---|---|---|
| WO | 03090444 A2 | 10/2003 |
| WO | 2005055196 A2 | 6/2005 |

OTHER PUBLICATIONS

Minerva M Yeung et al: "Video Visualization for Compact Presentation and Fast Browsing of Pictorial Content" IEEE Transactions on Circuits and Systems for Video Technology, IEEE Service Center, vol. 7, No. 5, Oct. 1997, p. 774-776.

Erkan G et al: "LexRank: Graph-Based Centrality as Salience in Text Summarization" Journal of Artificial Intelligence Research AI Access Foundation & Morgan Kaufmann Publishers USA, vol. 22, 2004, p. 5-p. 8, XP002441365.

Yeung M et al: "Segmentation of Video by Clustering and Graph Analysis" Computer Vision and Image Understanding, Academic Press, San Diego, CA, US, vol. 71, No. 1, Jul. 1998, pp. 94-109, XP004448871.

Xiaodi Huang et al: "Noderank: A New Structure Based Approach to Information Filtering" Proceedings of the International Conference on Internet Computing, CSREA Press,, US, vol. 197, 2003, pp. 1-9, XP008079949.

M. Barbieri, et al: "Video Summarization: Methods and Landscape" Proceedings of the SPIE, SPIE, Bellingham VA, US, vol. 5242, Sep. 7, 2003, pp. 1-13, XP002337434.

Chong-Wah Ngo et al: "Automatic Video Summarization by Graph Modeling" Proceedings of the Eight IEEE International Conference on Computer Vision. (ICCV). Nice, France, Oct. 13-16, 2003, Los Alamitos, CA : IEEE Comp. Soc, US, Comp. Soc, US, vol. vol. 2 of 2. Conf. 9, pp. 104-109, XP010662277.

Newman M E J: "Analysis of weighted networks" Physical Review E (Statistical, Nonlinear and Soft Matter Physics) APS Through AIP USA, vol. 70, No. 5, Nov. 2004, pp. 56131-1-56131-9 XP002441366 p. 1-p. 3.

* cited by examiner

METHOD AND DEVICE FOR AUTOMATIC GENERATION OF SUMMARY OF A PLURALITY OF IMAGES

The present invention relates to the field of extracting a content summary of a plurality of images, e.g. a video sequence. More specifically, the invention provides a method and a device for automatic generation of a summary of a plurality of images where a story line or the logical plot is preserved.

Summarization has become a highly necessary tool in browsing and searching home video collections and produced video archives or photo archives, saving users' time and offering great control and overview. Various types of summarization methods have been offered in the literature: visual table of contents, skimming, and multimedia summaries. Also, various domains have been explored such as structured video summarization for news, music videos, and sports.

Users would like to watch a film in a shorter time than the original duration while understanding the logical plot, i.e. it is a requirement that the overall story line of the film is preserved. Algorithms for fast forward and audio compression have been proposed that allow accelerating the viewing pace up to 1.5~2 times. One possibility is to increase the playback speed, however fast playback requires a very high attention level from the viewers and can become funny and incomprehensible.

Thus, still a goal remains to be narrative video summarization, which includes methods for summarizing narrative content of a video sequence such as movies, documentaries and home videos. Summarization for narrative multimedia content such as film is an active research topic, however the usual aim is to create previews that do not convey all the information about the story of the original film.

WO 03/090444 discloses methods for selecting a subsequence of a video frames from a video sequence. A distance function relating two video frames to each other is defined in the sequence of video frames, e.g. a distance between RGB histograms of the frames. An optimization criterion is defined to express a feature of a plurality of subsequences of video frames selected from the sequence of video frames. A subsequence of video frames is then determined by optimizing the values of an optimization criterion function defined on all the subsequences, e.g. an energy function. In WO 03/090444 the distance function relating frames to each other is based on a visual distance between frames. Thus, the selected subsequence of frames will be a set of key frames that are the most different frames with respect to visual content, and thus in a sense be representative for the video sequence. However, since two frames are only interrelated by a visual distance, the selected subsequence will not necessarily represent a summary reflecting the story line and the real meaning of the video sequence.

Hence, it is an object to provide a summarization method and system capable of providing a summary sequence reflecting the logical plot of plurality of images, e.g. a video sequence, and still with the same playback rate as the original video sequence.

This object and several other objects are obtained in a first aspect of the invention by providing a method for providing a summary of a plurality of images, the method comprising:

a) dividing the plurality of images into a plurality of segments, each segment comprising at least one image, b) analyzing each segment with respect to content and associating a set of content descriptors resulting from the analysis of said segment, c) establishing relations between the segments based on the content descriptors, wherein each relation between first and second segments has one or more weights associated thereto, the one or more weights representing a measure of relation between the first and second segments, d) determining for each segment a measure of relevance based on the weights associated with relations to said segment, e) generating a summary by selecting a subset of segments from the plurality of segments based on the relevance parameters associated with the segments.

By 'plurality of images' is understood a set of images, such as an archive of photos or a video sequence of image frames. By 'measure of relation' is to be understood a measure representing a degree of relation between two segments. For example, the 'measure of relation' may be a measure representing logical correlation between segments or it may simply be a measure of how similar the segments are, with respect to a specific content descriptor.

The invention is particularly, but not exclusively, advantageous for automatically generating a summary of a film or a home video etc. In preferred embodiments it is possible to automatically generate a summary which will include the essence of the original input video sequence, and since the summary is generated from selected segments or scenes from the original video sequence, the summary will have a natural playing rate, i.e. without introducing a forced an unnatural high speed.

The method may also be used to generate a summary of an archive of photos, e.g. an archive of photos from a holiday etc., where it is desired to have a summary representative of the content of the photos. In case of photos, a segment may be either a single photo or a set of photos.

In case of for example a video sequence that has already been divided into segments, e.g. one chapter for each scene of the video sequence, it is to be understood that step a) can be omitted. Otherwise, step a) may include a temporal segmentation, e.g. based on detection of segment boundaries using a frame difference detection method as known in the art.

In step c) a very compact representation of the plurality of images using a very limited amount of data is established. E.g. a 1.5-hour film can be represented using 5-10 content descriptors and typically a division into 700-1000 segments?

Preferably, step e) includes selecting the segments with the highest measure of relevance value. In other words, the one or more segments with the smallest degree of relation to the remaining segments of the plurality of images are omitted first, and thus excluded from the summary. Hereby, it is effectively ensured that the summary will be based on segments with the maximum possible semantic content of the plurality of images, and thus the summary will to the best possible degree reflect the core of the meaning of the plurality of images.

Since the weights indicate to which degree two segments are related (high weight value reflects high degree of relation; the weight could e.g. be determined as the correlation factor between parameter sets of two segments, the sets comprising as least one parameter), the relevance measure is preferably calculated based on a sum of all weights associated with relations to a particular segment. The relevance measure may especially be equal to the sum of all weights associated with relations to the particular segment.

In preferred embodiments, additional textual information associated with a segment is taken into account in the content analysis of said segment, e.g. in step b) and preferably also in establishing a relation between said segment and other segments. The textual information can be embedded in the video content, e.g. subtitles, or stored in the same physical or logical carrier with a video sequence, e.g. subtitles on DVD disks or closed captions transmitted together with TV broadcasts.

Thus, such additional textual information may be used to support the content analysis which may otherwise be based solely on an automatic algorithm applied to the plurality of images themselves. In case the additional textual information is embedded in the plurality of images themselves, e.g. as subtitles, a preferred extra step includes the step of extracting such additional textual information from the plurality of segments in order to be able to take it into account for further analysis. The extraction of the additional textual information may include speech recognition in case the additional textual information is to be extracted from e.g. narrative speech embedded in an audio part in connection with the plurality of images.

It may be preferred to include into the summary, relevant part of the additional textual information. This can be done as subtitles in a video part of the summary and/or by converting the additional textual information into speech using a speech synthesis method.

The plurality of images may be only images or image frames, or additionally an audio part associated with the plurality of images, e.g. a sound track of a film. The additional textual information may include a brief text that describes a scene of a film, e.g. with information including who, where and when. In general, the additional textual information may include for example: subtitles (e.g. manually entered and synchronized by humans), a film script (e.g. written by humans and automatically aligned to a video sequence), a speech transcript (e.g. written by human or generated by means of automatic speech recognition). Additional textual information may be provided as a separate service for providing manual annotations synchronized with the video sequence for the purpose of facilitating personalized reader's digest, e.g. metadata about 'who is in the scene', 'what is in the scene', 'where is the scene', 'why something is happening or shown', etc.

In case the plurality of images include both a video part and an audio part, content descriptors taking into account both the video part and the audio part are preferably included. E.g. both pictures and a voice signal may be analyzed and used to extract information regarding which person(s) or film character(s) is/are present in a certain segment of a video sequence. Preferably, the relations include at least one relation based on the audio part and one relation based on the video part. Hereby the best possible utilization of the available data in connection with the plurality of images, i.e. both video and audio data, is provided.

Preferably, the relations include at least one relation based on one or more of:
1) a distance in time between the first and second segments,
2) co-occurrence of keywords in textual information associated with the respective first and second segments,
3) co-appearance of a person in the first and second segments,
4) a field-of-view in a video part of the segments.

With respect to 1), segments far apart in time should have assigned a big distance, and therefore a weight between two visually similar segments but far apart in time should not be as big as when the segments are also near each other in time, for example when they actually belong to the same scene or chapter.

With respect to 3), person identification based e.g. on face detection, and recognition and/or voice recognition should be included in step b).

With respect to 4), by field-of-view is understood a distance of the camera from the subject, and the focal length of the lens used in the particular segment, e.g. close-up, long shot, medium shot etc.

Preferably, the steps c) to e) are repeated in order to reduce a number of segments, e.g. one by one, until the selected subset of segments meets a predetermined stopping criterion. Such stopping criterion can be a predetermined maximum playback time of the selected subset of segments. E.g. a user wants to see a 45-minutes boil down of a 1.5 hour film. Then segments are removed until the total playback time of remaining segments are equal to or lower than 45 minutes.

In general, the summary may be generated taking into account preferences input by a user, e.g. with respect to playback time, as mentioned above. However, user preferences regarding specific topics or film characters may be input by the user and taken into account in any one or more of steps c), d), and e), so that the summary reflects special preferences by the user. E.g. the user may be interested in car hunts, and thus segments including car hunts are removed later than other segments, e.g. by manipulating a relevance measure to be high in segments with car hunt scenes. Especially, the weights of step c) may be calculated as a function of the preferences input by the user.

In a second aspect, the invention relates to an executable computer program code adapted to enable a computer to perform the method according to the first aspect. The program code may be a generic program code or a processor specific program code. The program code may be adapted to be executed on a Personal Computer or a on any device including a data processor. This aspect of the invention is particularly, but not exclusively, advantageous in that the present invention may be implemented by a computer program product enabling a computer system to perform the operations of the first aspect of the invention. Thus, it is contemplated that some known apparatus may be changed to operate according to the present invention by installing a computer program product on the apparatus and thus enable the apparatus to perform the method according to the first aspect.

In a third aspect, the invention relates to a data carrier including an executable computer program code according to the second aspect. The data carrier any kind of computer readable medium, e.g. magnetically or optically based medium, or through a computer based network, e.g. the Internet.

In a fourth aspect, the invention provides a device comprising processing means adapted to perform the method according to the first aspect. The device may include storage means to store a summary generated, and/or display means adapted to show the summary. The device may be such as a personal video recorder, a harddisc recorder, a DVD player, a video camera, a home media server, a Personal Computer (PC), an e-hub device, a video on demand system etc.

In a fifth aspect, the invention relates to a system including a device according to the fourth aspect and display means arranged to display a video part of the summary. The system may also include a loudspeaker in order to be able to present also an audio part of the summary generated by the device. The system may be integrated with the device, e.g. a TV set including a harddisc drive and processing means adapted to generate the summary and either present it on the TV screen or store it on the harddisc. Alternatively, the system may be formed by separate components, e.g. where the device adapted to generate the summary is a stand-alone apparatus and other parts of the system include e.g. display means and storage means. As an example, the system may be a PC with software adapted to generate the summary based on video sequences or photos stored on a remote server connected to the PC via the Internet.

It is appreciated that advantages and embodiments mentioned for the first aspect also apply for the second, third and fourth aspects of the invention. Thus, any one aspect of the present invention may each be combined with any of the other aspects.

BRIEF DESCRIPTION OF THE FIGURES

The present invention will now be explained, by way of example only, with reference to the accompanying Figures, where.

Figure 1:
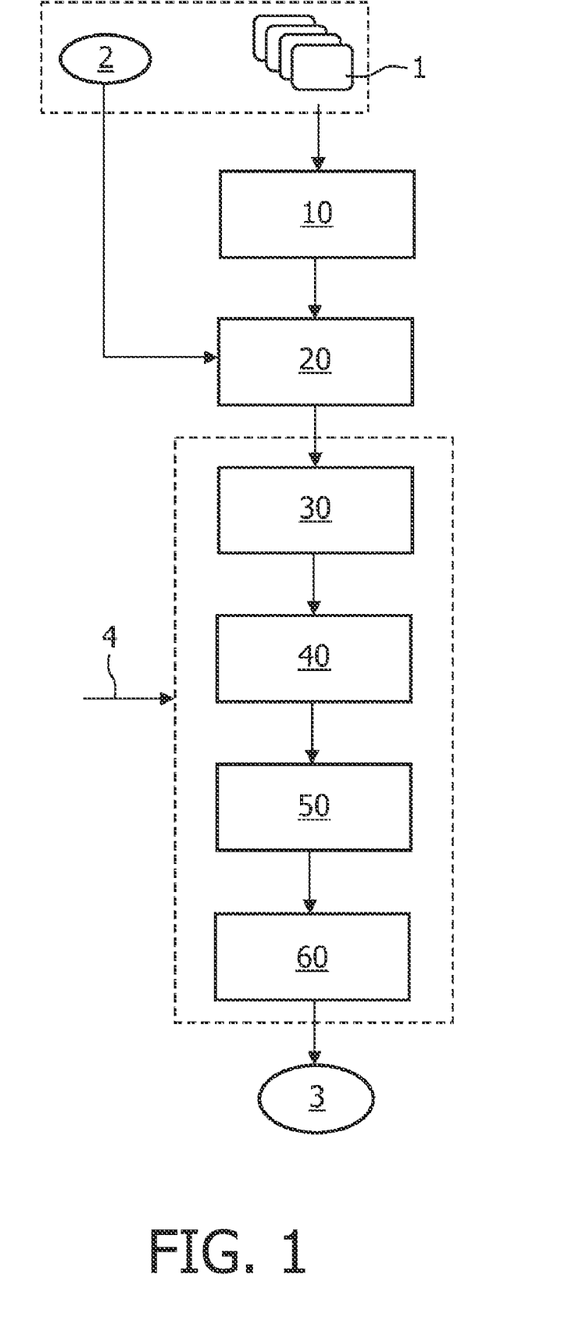
FIG. 1 illustrates a flowchart of a preferred embodiment of the method according to the invention.

FIG. 1 shows a preferred method for generating a video summary 3 of a video sequence 1, e.g. a film with audiovisual content. Preferably, additional textual information 2 is available in addition to the video sequence 1. Such additional textual information 2 can include subtitles, closed captions, speech transcript, screenplay, etc. Especially, the speech additional textual information 2 may be extracted from an audio part of the video sequence 1 using speech recognition to provide text representing spoken language. See e.g. WO 05/055196 A2 related to identification of film characters using screenplay, transcript, web and audio features.

First, an automatic temporal segmentation 10 of the video sequence 1 is performed. Here, the video sequence 1 is divided into logical coherent segments, where each segment represents a shot or scene of the film. The temporal segmentation may be based on shot boundary detection such as known in the art, i.e. including various low level descriptors that are used to detect differences between single frames of the video sequence 1. It is to be understood, that the temporal segmentation step 10 can be omitted in case the video sequence 1 is already divided temporal segments, e.g. chapters representing shots or scenes.

Next, a content analysis 20 is performed on the segments in order to be able to represent their content by calculating for each segment a set of different content descriptors. Content descriptors on a rather low level may be includes as well as content descriptors on a quite high level of abstraction may be used. If available, the content analysis 20 is preferably assisted by additional textual information 2 associated with each segment, e.g. information about which persons are present in the scene etc.

Both an audio and a video part of the segments can be used to calculate content descriptors—either separately or in combination. A non-exhaustive list of content descriptors is:
- color distribution, e.g. by calculating a color histogram,
- audio class, analysing an audio part of the segments and categorizing its content as e.g. speech, silence, music etc.,
- location and presence of faces
- person identification such as by using face and/or speech recognition,
- field of view of the scene, e.g. close-up, medium, long, extreme long etc.

In case additional textual information 2 is available, such as closed captions or screenplay, such information is analyzed to extract textual descriptors in the form of keywords about which persons are present in the segment, what is going on, where and when (in narrative time) the event is taking place. See e.g. WO 05/055196 A2 related to identification of film characters using screenplay, transcript, web and audio features.

After a number of content descriptors have been associated with the segments, relations between the segments are established 30, and a very compact representation of the video sequence is thus provided. In connection with the relations, weights are applied with the purpose of reflecting if two segments are logically related (high weight value) or not logically related (low weight value). Especially, such weights, for a relation between two segments, can be vectors of weights where each weight represents a measure of similarity with respect to one content descriptor. Thus, for each relation between two segments, a set of weights exists that describes the logical relationship between the segments in different respects.

After weights have been applied to the relations, the step of determining a measure of relevance 40 is performed for each segment. The measure of relevance is preferably determined as the sum of all weights associated with relations concerning the particular segment. Thus, if the sum of all weights is high, the segment is considered to be relevant, while a segment is considered not relevant if the sum of all weights is low.

The next step includes selecting a subset of the segments 50. This selection may by done step by step by selecting first the segments with the highest measure of relevance values, e.g. by omitting one by one with an intermediate recalculation of weights and relevance measures or by simply performing the selection by omitting a larger number of segments at a time, i.e. omitting the segments with the lowest relevance measure values.

The final step 60 is thus generating the summary 3 by taking the selected segments of the video sequence, i.e. the segments that have been selected in step 50. In a simple embodiment, the summary 3 is simply generated by concatenating the selected segments in chronological order.

As will be appreciated, the summary 3 may be provided in any form as an analog or digital signal or in any type of data representation suited for immediate playback and/or storage on a storage medium. Thus, the method can be applied for on-line generation of a summary 3 in case the necessary data processing power is available, or summaries of video sequences of an entire video archive can be off-line generated.

In any of steps 30, 40, 50, an 60 a user input 4 may be taken into account in order to suit the final summary 3 to preferences by the user and thus it is possible to personalize the information presented in the summary based on preferences 4 input by the user. This input 4 may have been stored in advance. Based on personal preferences the summary can include different elements. If the person is interested more in certain parts of a film or movie, then segments pertaining to those parts are selected over segments involving other elements of the story etc. To achieve this type of personalization the user input 4 can include a user profile, e.g. keywords with associated importance weights that are added to matching segments during the summary construction, i.e. in any one or more of steps 30, 40, 50 and 60.

In case the user input 4 indicates very specific preferences, this may also be taken into account already in step 10 or 20, and these steps can then be arranged such as to focus on the aspects that interest the user, and possibly other aspects can be omitted, thereby limiting the amount of computation power needed to perform step 20 and also possibly subsequent steps, since certain features of the segments may be irrelevant to the user.

In some embodiments, the summary can also be a multi-level one, e.g. a summary with a hierarchical structure. Hereby, it is possible for the user to select between a set of segments at a higher level. At any time, the user can go "deeper" in the tree and get more segments related to the one he is viewing. And similarly, the user can "pop up" in order to go back to a higher level. The data representation and processing to be described in the following is suited for such hierarchical selection of segments parts.

Figure 2:
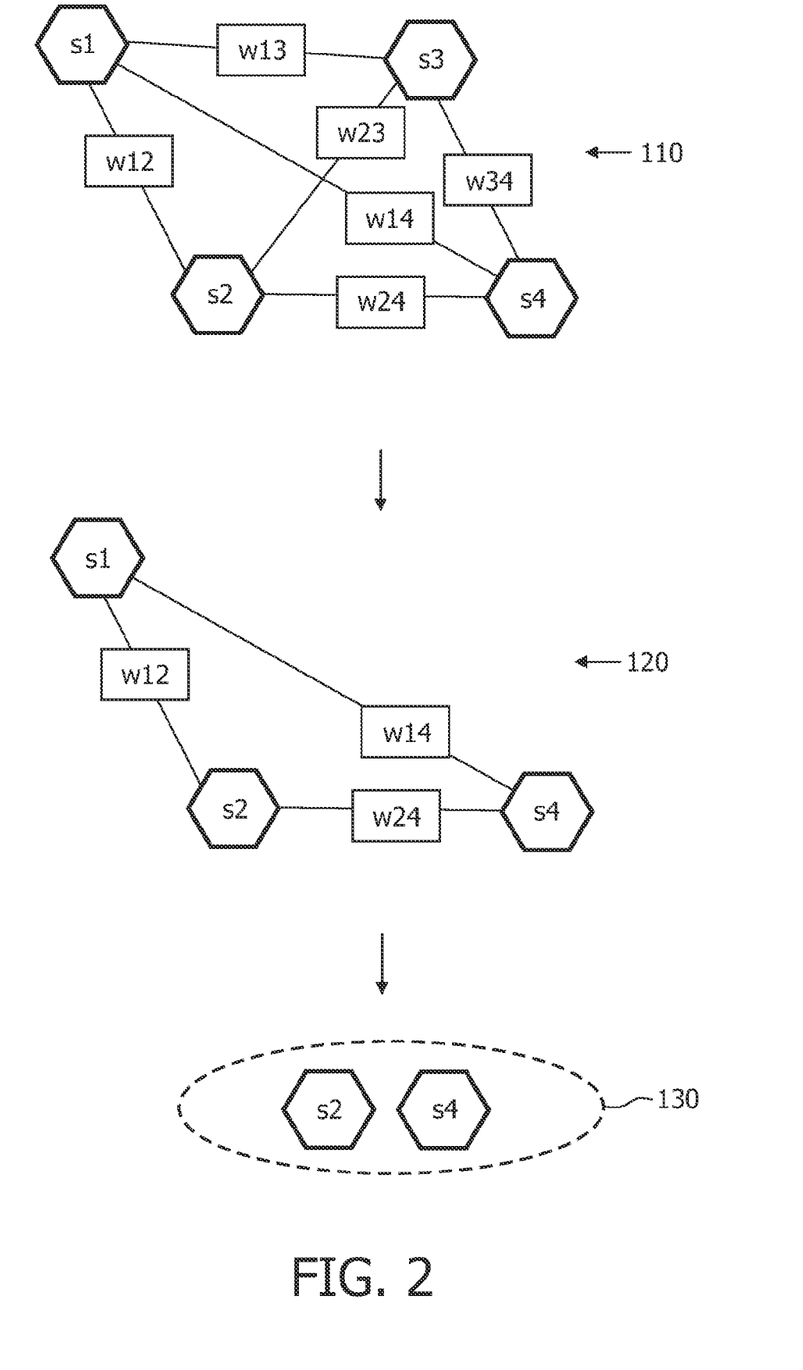
FIG. 2 illustrates the principle of removing segments from an initial video sequence of segments in order to arrive at a summary being a subset of segments of the initial segments.

FIG. 2 illustrates in more detail with exemplary sketches the steps 30, 40 and 50. A simple case of a video sequence divided into four segments s1, s2, s3, s4 is illustrated in 110 and thus represents an embodiment of step 30. Lines connecting the segments s1, s2, s3, s4 indicate relations between the segments s1, s2, s3, s4. Vectors w12, w13, w14, w23, w24, w34 represent set of weights, each weight representing a value reflecting a measure of relation, e.g. a similarity or logical correlation between the two segments to which the relation applies. A vector preferably includes separate weights for each of the content descriptors extracted in the segment analysis step 20. Thus, vector w12 includes a set of weights indicative of a similarity of the set of content descriptors associated with segments s1 and s2. As seen in 110, all data are represented in a graph.

The weights applied to a relation between two segments may be based on a large variety of content descriptors. A few examples of type of relations and how weights are applied based on content descriptors associated with each of the two segments:

- succession, i.e. a weight indicates if two segments are successive segments,
- keyword co-occurrence, i.e. segments with same or similar keywords has a weight given by the number of co-occurrences,
- person or character appearance, i.e. weight is given by the total relative amount of overlapping time where the same person or character appears in the two segments,
- content similarity based on signal features, i.e. weights is given by the actual similarity function,
- content similarity based on audio class, i.e. a high weight indicates the presence of the same audio class (speech, music etc.) in a certain period of time in the two segments,
- content similarity based on field of view, i.e. a high weight indicates the presence of the same field of view (e.g. close-up, long shot, medium shot etc.) in a certain period of time in the two segments.

Keyword co-occurrence and person or character appearance appears to be especially important features for establishment of a relation between segments that results in a summary 130 reflecting the logical plot of the input segments s1, s2, s3, s4.

The graph 110 is a very compact representation of the video sequence with only a limited amount of single data values. Its structure provides clues on the relative importance of the content of the segments, and the graph 110 is a useful representation for the subsequent steps 40, 50 and 60.

In step 40, a relevance measure is assigned to each of the segments s1, s2, s3, s4 based on the vectors w12, w13, w14, w23, w24, w34. Preferably, a relevance measure for a segment is based on a sum of all weights applied to relations to the segment. E.g. a relevance measure for segment s1 can be expressed as a vector sum of w12, w13 and w14. In case a user input 4 indicates for example a preference for a specific character in a film, the relevance measure can be influenced by this preference, e.g. by applying extra weight to the weight of the vectors w12, w13, w14 indicating the presence of this character when the sum of weights is calculated. Thus, the final summary 3 can be customized in the sense that the user can specify a minimal version of the summary 3 that contains the essentials of the story and its resolution or an optimal version that includes more information. This is made possible due to the amount of information and metadata that has been extracted for the video sequence and the graph representation 110 of data.

In step 50, a "graph pruning" is performed based on the relevance measure. Preferably, selection of segments and the decisions of which segments to include in the summary are based on weights within whole graph.

This is illustrated in 120, where segment s3 has been removed, since it is assumed that s3 was the segment of the four segments s1, s2, s3, s4 with the lowest relevance measure, and thus the segment which can assumed to have a content which is the least relevant to represent the semantic core of the video sequence 1. A further pruning is performed between 120 and 130 where segment s1 has been removed since is it found to be the least relevant segment of the three remaining segments s1, s2, s4. In general, the pruning of segments is continued until a stopping criterion is reached. For example, the stopping criterion is based on a user input 4 indicating a preferred maximum playtime of the summary, and thus the pruning is continued until the remaining segments have a total playtime which is equal to or less than the playtime indicated in the user input 4. Alternatively, the stopping criterion may be a percentage of the playtime of the entire video sequence 1, e.g. the summary may be chosen to approximate 70% of playtime of the original video sequence.

Finally, when a stopping criterion is met, the step of generating the summary 60 can be performed. In a simple embodiment, the summary is a concatenation of the remaining segments, e.g. in FIG. 2 the summary 130 includes segments s2 and s4, and the summary 130 may simply be the audio-video content of these segments s2, s4, preferably played in chronological order so as to best possibly reflect the chronological playback of the video sequence 1.

For creating the summary, nodes with the least weight are removed one by one till the desired length is reached. The weight of the node is the sum of the weights of the arcs that are connected to the node.

Figure 3:
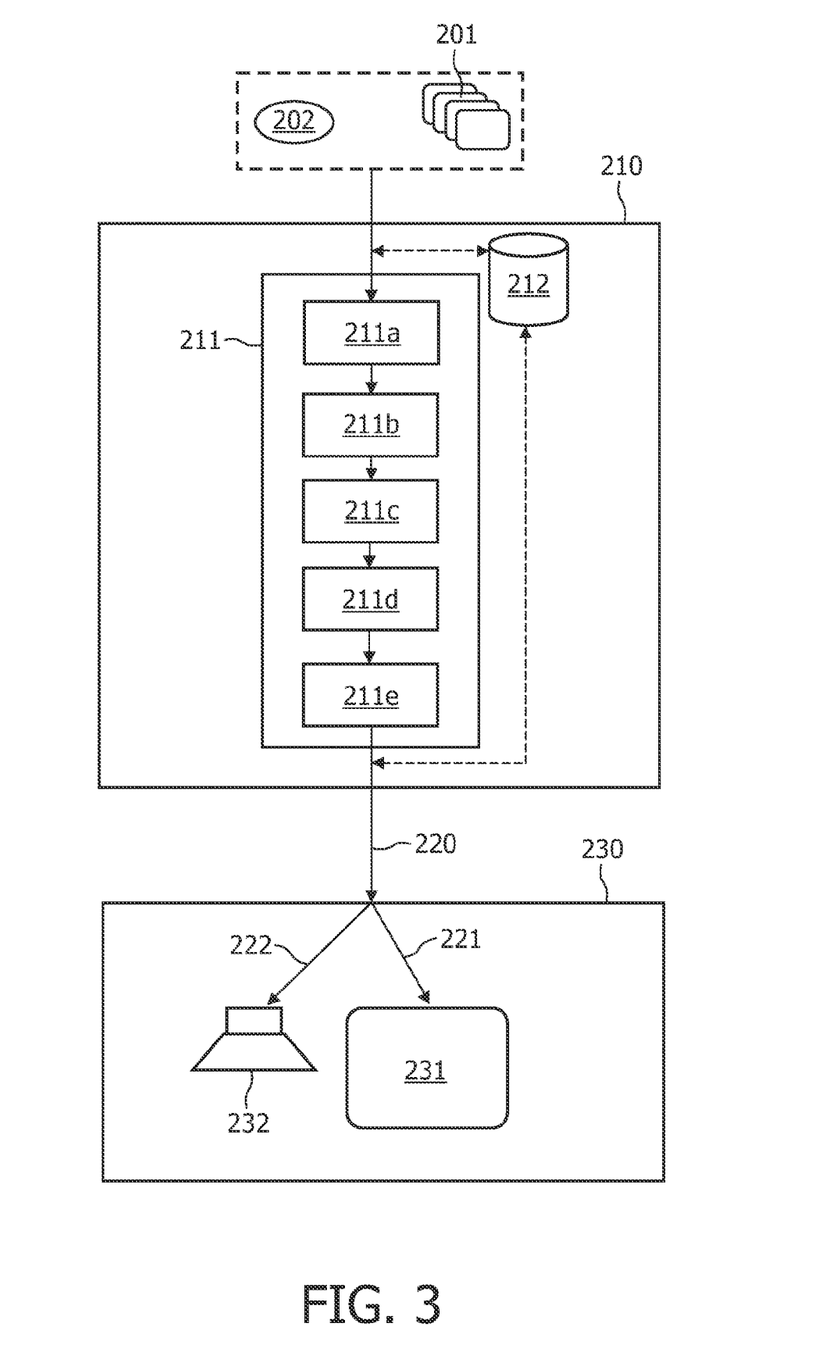
FIG. 3 illustrates a sketch of a preferred device according to the invention.

FIG. 3 illustrates a system including a device 210 with a processor 211 adapted to perform the method according to the first aspect of the invention, i.e. the device 210 includes dividing means 211a, analyzing means 211b, relation analyzing means 211c, relevance determining means 211d, and a summary generator 211e. The device 210 may be a personal video recorder, a home media server, a media centre PC, a e-hub device, a video on demand system etc. The device receives a signal including a video sequence 201, e.g. a MPEG compatible video and audio signal received from a DVD player either integrated with the device 210 or an external DVD player connected to the device 210. In addition, to the video sequence, the device 210 also receives additional textual information 202 associated with the video sequence 201. The device processes the input signal 201, 202 in the processor 211 and generates in response a summary 220. As indicated with dashed lines, the device may either store the input signal 201, 202 on a built-in storage means 212, e.g. a harddisc 212, and then generate the summary 220 upon request. Alternatively, the summary 220 is generated immediately and output, or the summary 220 is generated and stored on the storage means 212 until the summary 220 is requested.

The system of FIG. 3 also shows summary presenting means 230 adapted to present a video part 221 and an audio part 222 of the summary 220. The video part 221 is presented in a display screen 231, e.g. an LCD display, while the audio part 222 is presented using a loudspeaker 232. Optionally, the summary 220 may include parts of the additional textual information 202. These parts of the additional textual information 202 may be displayed on the display screen 231 or on an additional user interface/display, and/or the parts of the additional textual information 202 may be presented via the loudspeaker 232 in case the text is converted to artificial speech by means of speech synthesis. The summary presenting means 230 may be a TV set with a built-in loudspeaker etc.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

Furthermore, the invention may also be embodied with less components than provided in the embodiments described here, wherein one component carries out multiple functions. Just as well may the invention be embodied using more elements than depicted in FIG. 2, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

The invention claimed is:

1. A method for providing a summary of a plurality of images, the method comprising the acts of:
    dividing by a processor the plurality of images into a plurality of segments, each segment comprising at least one image;
    analyzing the each segment with respect to content and associating a set of content descriptors resulting from the analyzing act;
    establishing relations between the plurality of segments based on the content descriptors, wherein each relation between first and second segments has one or more weights associated thereto, the one or more weights representing a measure of relation between the first and second segments;
    determining for the each segment a relevance parameter based on the weights associated with relations to said segment; and
    generating a summary by selecting a subset of segments from the plurality of segments based on the relevance parameters associated with the segments,
    wherein the relevance parameter of each segment is based on a sum of all weights associated with relations to said segment.

2. The method according to claim 1, further comprising the act of taking into account available additional textual information associated with a segment in the analyzing act and the establishing act.

3. The method according to claim 2, further comprising the act of extracting the additional textual information from the plurality of images.

4. The method according to claim 1, wherein the plurality of images includes a video part and an audio part, and wherein the content descriptors take into account both the video part and the audio part.

5. The method according to claim 4, wherein the relations include at least one relation based on the audio part and one relation based on the video part.

6. The method according to claim 1, wherein the relations include at least one relation based on a distance in time between the first and second segments.

7. The method according to claim 1, wherein the relations include at least one relation based on co-occurrence of keywords in first and second textual information associated with the first and second segments, respectively.

8. The method according to claim 1, wherein the relations include at least one relation based on co-appearance of a person in the first and second segments.

9. The method according to claim 1, wherein the relations include at least one relation based on a field-of-view in a video part of the segments.

10. The method according to claim 1, wherein the generating act includes the act of removing a segment with a relevance parameter having a lowest value.

11. The method according to claim 1, wherein establishing act and the generating act are repeated in order to reduce a number of segments until the selected subset of segments meets a predetermined stopping criterion.

12. The method according to claim 11, wherein the predetermined stopping criterion includes a predetermined maximum playback time of the selected subset of segments.

13. The method according to claim 1, wherein the summary is generated taking into account preferences input by a user.

14. The method according to claim 13, further comprising calculating the one or more weights as a function of the preferences input by the user.

15. A device configured to generate a summary of a plurality of images, the device comprising processing means including:
    dividing means arranged to divide the plurality of images into a plurality of segments, each segment comprising at least one image;
    analyzing means arranged to analyze the each segment with respect to content and associating a set of content descriptors resulting from the analysis of said segment;
    relation analyzing means arranged to establish relations between the segments, wherein each relation between first and second segments has one or more weights based on the content descriptors associated thereto, the one or more weights representing a measure of relation between the first and second segments;

relevance determining means arranged to determine for the each segment a relevance parameter based on the weights associated with relations to said segment; and a summary generator arranged to generate the summary by selecting a subset of segments from the plurality of segments based on the relevance parameters associated with the segments, wherein the relevance parameter of each segment is based on a sum of all weights associated with relations to said segment.

16. A system comprising a device according to claim 15, and display means arranged to display a video part of the summary.

17. A non-transitory computer readable medium embodying computer instructions which, when executed by the processor, configure the processor to perform the method of claim 1.

18. A device configured to generate a summary of a plurality of images, the device comprising a processor configured to perform the acts of:

dividing the plurality of images into a plurality of segments, each segment comprising at least one image;

analyzing the each segment with respect to content and associating a set of content descriptors resulting from the analyzing act;

establishing relations between the plurality of segments based on the content descriptors, wherein each relation between first and second segments has one or more weights associated thereto, the one or more weights representing a measure of relation between the first and second segments;

determining for the each segment a relevance parameter based on the weights associated with relations to said segment; and generating a summary by selecting a subset of segments from the plurality of segments based on the relevance parameters associated with the segments, wherein the relevance parameter of each segment is based on a sum of all weights associated with relations to said segment.

* * * * *